US008527883B2

(12) United States Patent
Sullivan

(10) Patent No.: US 8,527,883 B2
(45) Date of Patent: Sep. 3, 2013

(54) BROWSER OPERATION WITH SETS OF FAVORITES

(75) Inventor: Michael J. Sullivan, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 12/338,443

(22) Filed: Dec. 18, 2008

(65) Prior Publication Data

US 2010/0161587 A1    Jun. 24, 2010

(51) Int. Cl.
*G06F 3/00* (2006.01)

(52) U.S. Cl.
USPC ........... 715/738; 715/206; 715/205; 715/745; 715/760; 715/854

(58) Field of Classification Search
USPC .................. 715/738, 206, 205, 745, 760, 854
See application file for complete search history.

(56) References Cited

U.S. PATENT DOCUMENTS

| | | | |
|---|---|---|---|
| 6,189,024 B1 * | 2/2001 | Bauersfeld et al. ........... | 709/203 |
| 6,393,462 B1 * | 5/2002 | Mullen-Schultz ............ | 709/206 |
| 6,452,609 B1 * | 9/2002 | Katinsky et al. .............. | 715/716 |
| 7,774,721 B2 * | 8/2010 | Milic-Frayling et al. ..... | 715/855 |
| 2003/0115589 A1 * | 6/2003 | D'Souza et al. ................ | 725/10 |
| 2005/0289468 A1 * | 12/2005 | Kahn et al. ..................... | 715/738 |
| 2006/0288111 A1 * | 12/2006 | Katinsky et al. .............. | 709/228 |
| 2008/0005686 A1 * | 1/2008 | Singh ............................ | 715/764 |
| 2008/0183573 A1 * | 7/2008 | Muschetto ...................... | 705/14 |
| 2008/0313206 A1 * | 12/2008 | Kordun et al. ................ | 707/102 |
| 2009/0158155 A1 * | 6/2009 | Quinn et al. ................... | 715/716 |
| 2010/0082670 A1 * | 4/2010 | Chan et al. .................... | 707/770 |
| 2010/0131844 A1 * | 5/2010 | Wohlert ........................ | 715/716 |
| 2010/0161587 A1 * | 6/2010 | Sullivan ....................... | 707/709 |

FOREIGN PATENT DOCUMENTS

WO    WO 2006/007651 A1    1/2006

* cited by examiner

*Primary Examiner* — Steven Sax
*Assistant Examiner* — David Choi
(74) *Attorney, Agent, or Firm* — Kunzler Law Group, PC

(57) ABSTRACT

Methods, apparatus, and products for browser operation with sets of favorites, the browser supporting tabbed browsing, where the browser operation includes opening, by the browser, a first member of a set of favorites in a new tab and loading, by the browser, a Uniform Resource Locator ('URL') for each member of the set into navigation memory for back and forward navigation functions for the new tab.

19 Claims, 4 Drawing Sheets

BROWSER OPERATION WITH SETS OF FAVORITES

BACKGROUND OF THE INVENTION

1. Field of the Invention

The field of the invention is data processing, or, more specifically, methods, apparatus, and products for browser operation with sets of favorites.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of technology that has experienced advances is Internet browser software applications. Tabbed browsing that enables multiple URLs to be loaded simultaneously and immediately, or nearly immediately, be displayed to a user is common featured operation of browsers today. Storing a user's favorite URLs as a favorites or bookmark is another common browser operation that enables control by a user of the user's browsing experience and operation of the browser. A user may, for example, specify a number of favorites as a set of favorites, categorizing the favorites. Although categorized sets of favorites and tabbed browsing are useful features in current browser operation, the combination of the two features is limited. In current browsers, for example, the only operation available for sets of favorites with respect to tabbed browsing is to open each favorite in the set in a separate tab. With a numerous members in a set of favorites, opening each favorite in a separate tab may result in inefficient browser performance and a poor user experience.

SUMMARY OF THE INVENTION

Methods, apparatus, and products for browser operation with at least one set of favorites are disclosed where the browser supports tabbed browsing, and the browser operation includes opening, by the browser, a first member of a set of favorites in a new tab and loading, by the browser, a Uniform Resource Locator ('URL') for each member of the set into navigation memory for back and forward navigation functions for the new tab.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
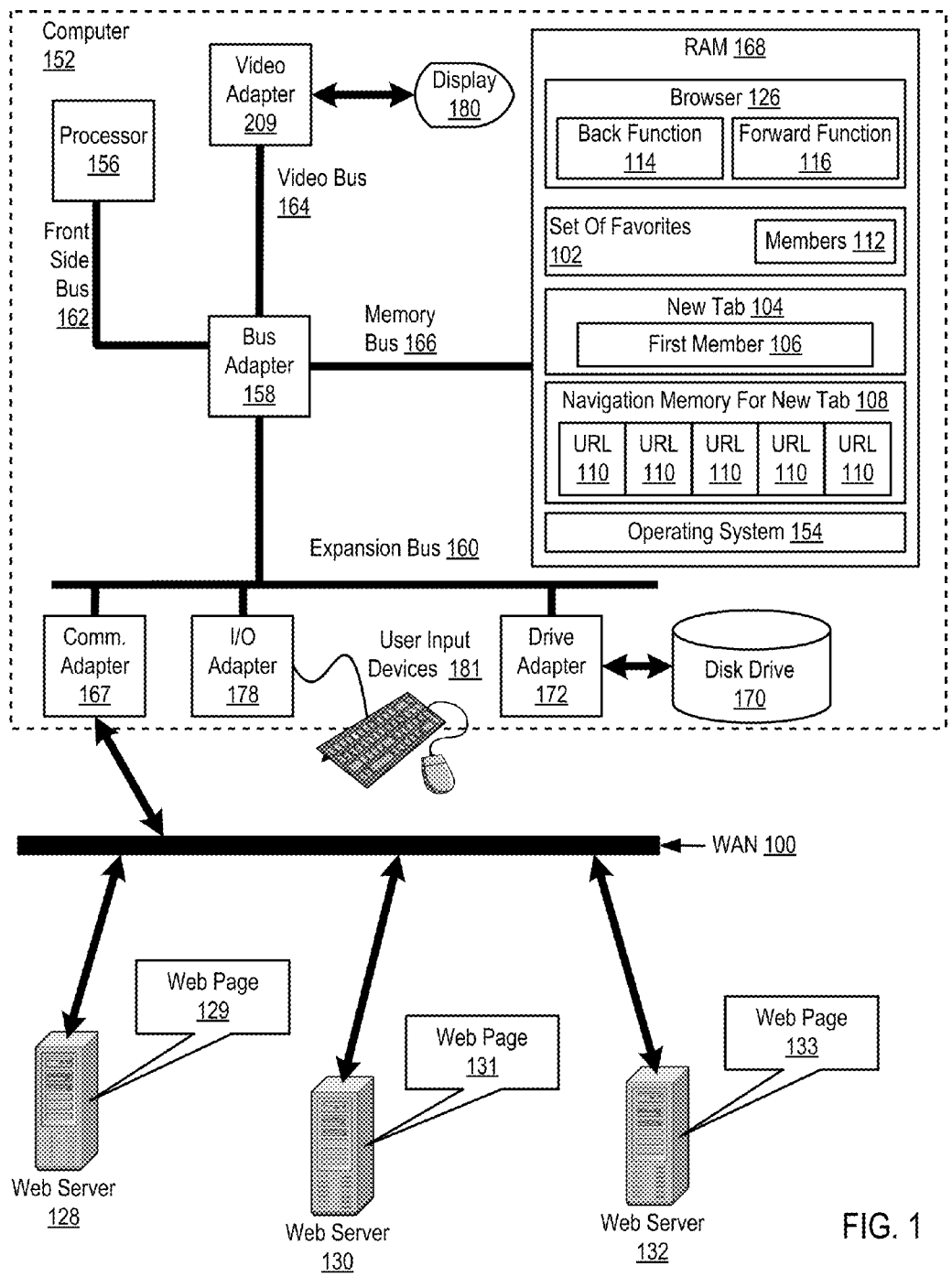
FIG. 1 sets forth a network diagram of an exemplary system for browser operation with sets of favorites according to embodiments of the present invention.

Exemplary methods, apparatus, and products for browser operation with sets of favorites in accordance with the present invention are described with reference to the accompanying drawings, beginning with FIG. 1. FIG. 1 sets forth a network diagram of an exemplary system for browser operation with sets of favorites according to embodiments of the present invention. A 'favorite,' also referred to as a bookmark, is a Uniform Resource Locator ('URL') stored in a data structure accessible by a browser. A set of favorites refers to a specified group of such stored URLs. Sets of favorites may be organized and implemented in a variety of ways including for example, as URLs organized as a set of favorites in a markup document, as one or more records of a database, with each record including a URL for a member of the set of favorites and an identification of the set, and in other ways as will occur to readers of skill in the art. Consider for clarity of explanation, the following markup language pseudo-code implementing URLs organized in a markup document as a set of favorites:

```
<Set setname= "Patent Info">
    http://www.patentlyo.com
    http://www.uspto.gov
    http://www.pat2pdf.org
</Set>
```

The above example markup language pseudo-code implements a set of favorites identified as "Patent Info" which includes three URLs, http://www.patentlyo.com, http://www.uspto.gov, and http://www.pat2pdf.org.

The system of FIG. 1 includes a computer (152) which in turn includes at least one computer processor (156) or 'CPU' as well as random access memory (168) ('RAM') which is connected through a high speed memory bus (166) and bus adapter (158) to processor (156) and to other components of the computer (152). The example computer (152) of FIG. 1 is connected for data communications through a Wide Area Network ('WAN') (100) to a number of web servers (128, 130, 132) with each server hosting a web page (129, 131, 131). The web pages (129, 131, 133) hosted by the web servers (128, 130, 132) may be implemented with HyperText Markup Language documents, and other files forming a web page as will occur to readers of skill in the art. A web server (128, 130, 132) as the term is used here refers to the computer hardware and computer software configured to host web pages and accept HyperText Transfer Protocol ('HTTP') requests from web clients, known as browsers, and serve the browsers HTTP responses along with optional data content, which may include HTML documents, web page elements, rich media objects, metadata describing the rich media objects, and the like.

Stored in RAM (168) of the computer (152) is a browser (126), a module of computer program instructions that operates according to embodiments of the present invention. 'Browser,' as the term is used in this specification, generally means a web browser, a software application for locating, requesting, retrieving, and displaying computer resources in the form of static or dynamic web pages or server-side scripting output. Browsers typically comprise both a markup language interpreter, web page display routines, and an HTTP communications client. Typical browsers today can display text, graphics, audio and video. Browsers are operative in any computer capable of data communications including web-enabled devices, wireless web-enabled devices, microcomputers, PDAs, laptops, and so on. Browsers in wireless web-enabled devices often are downsized browsers called "microbrowsers." Browsers typically support not only HTML (the 'HyperText Markup Language'), but other markup languages as well, including for example, XML (the 'eXtensible Markup Language'), and, in the case of wireless web-enabled devices, WML (the 'Wireless Markup Language') and HDML (the 'Handheld Device Markup Language'). The web browser (126) of FIG. 1 supports tabbed browsing. Tabbed browsing refers the capability of a browser to enable multiple tabs in a GUI, or sub-windows, to be opened within the GUI window the browser is open in, with each tab displaying a separate web page or other resource. A browser 'tab' as the term is used in this specification refers to both a GUI tab in GUI window of a browser, and the data structures, data, and computer program instruction supporting such a GUI tab. Each tab of a tabbed browser operates as a separate instance of the browser. Each tab, separated by GUI objects depicted as a tab of divider of a binder, is displayed graphically within a single window of the browser, although typically not simultaneously. That is, only one tab of a browser is typically displayed at any given time to the user, while other non-displayed tabs are available for immediate, or near-immediate, display, having previously loaded a resource in the non-displayed tab. Examples of browser's that support tabbed browsing include Mozilla's Firefox browser, Microsoft's Internet Explorer, and the Opera browser.

The example browser (126) of FIG. 1, in addition to tabbed browsing generally, is also configured for operation with sets of favorites in accordance with embodiments of the present invention. The example browser (126) of FIG. 1 operates with sets of favorites in accordance with embodiments of the present invention by opening, by the browser, a first member (106) of a set (102) of favorites in a new tab (104) and loading, by the browser (126), a Uniform Resource Locator ('URL') (110) for each member (112) of the set (102) into navigation memory (108) for back (114) and forward (116) navigation functions for the new tab (104). A new tab, as the term is used in this specification is any tab of a browser prior to loading a web page or other resource.

A set of favorites, when opened in a new tab, is referred to in this specification, for clarity of explanation not limitation, as a favorites playlist. The term 'playlist' is typically associated with music, video, and other digital multimedia files, where such a playlist is implemented as a list of files, typically in a user-defined order, where a playback device, playback software, or the like uses the list of files to identify a current file for playback, a next file for playback, a previous file, and so on. A favorites playlist as the term is used in this specification refers to navigation memory of a tab of a browser that includes URLs of members of a set of favorites. A favorites playlist is analogous to a playlist of multimedia files in that, like a multimedia playlist specifying an playback order among multimedia files, the favorites playlist typically defines an organization or browsing order among the items in the playlist, that is, among the URLs of the members of the set of favorites. That is, the browser (126) loads, in the new tab (104), a URL ordered in navigation memory prior to the currently loaded URL when a user pushes the back button, invoking the back function (114), and the browser loads, in the new tab, the URL located in navigation memory subsequent to the currently loaded URL, when the user presses the forward button of the browser, invoking the forward function (116), Also stored in RAM (168) is an operating system (154). Operating systems useful for browser operation with sets of favorites according to embodiments of the present invention include UNIX™, Linux™, Microsoft XP™, AIX™, IBM's i5/OS™, and others as will occur to those of skill in the art. The operating system (154), navigation memory (108), the new tab (104), the back (114) and forward (116) functions, and so on in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for browser operation with sets of favorites according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers, web servers (128, 130, 132), and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for browser operation with sets of favorites according to embodiments of the present invention include modems for wired dial-up communications, Ethernet (IEEE 802.3) adapters for wired data communications network communications, and 802.11 adapters for wireless data communications network communications.

The arrangement of web servers (128, 130, 132), networks (100), computer (152), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
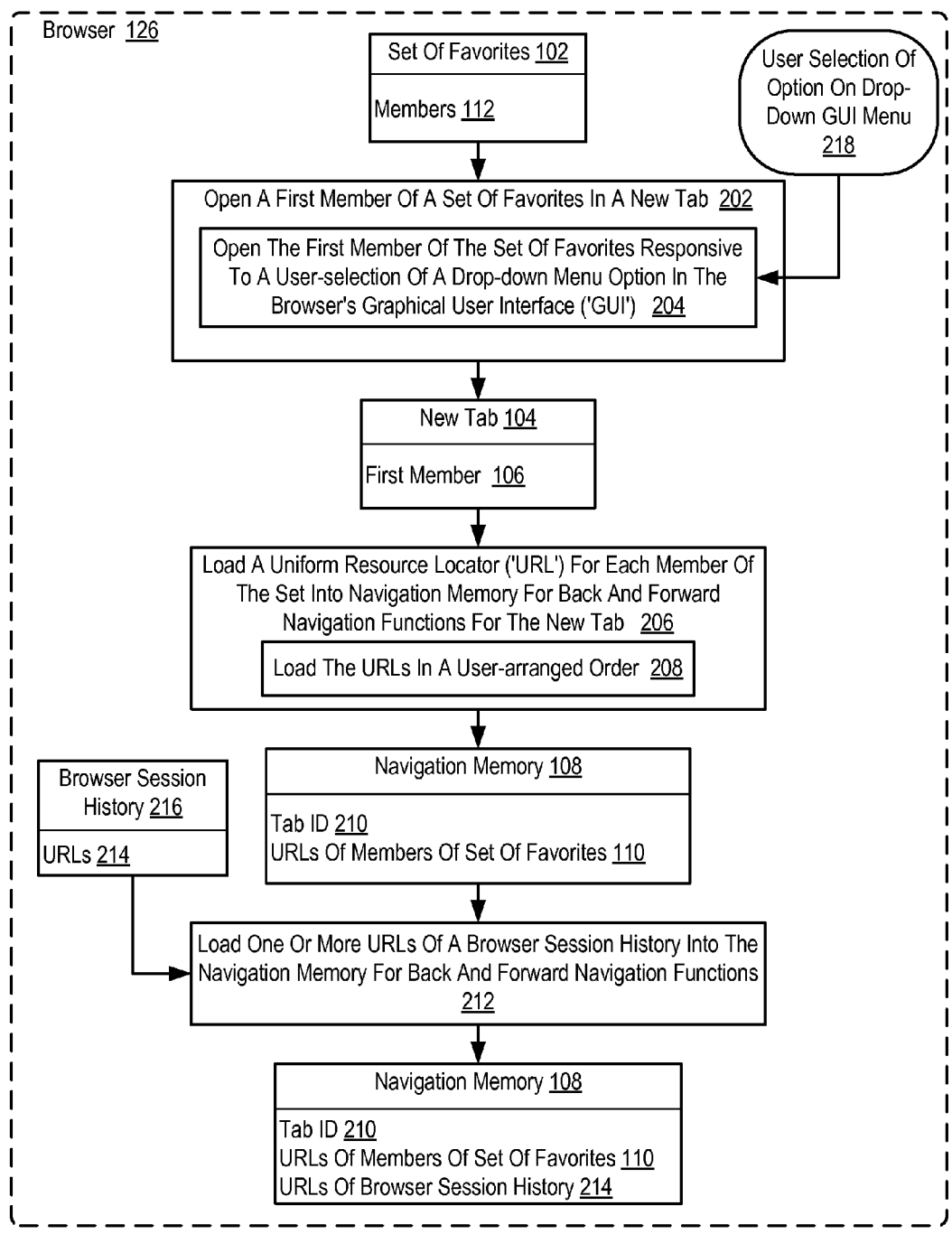
FIG. 2 sets forth a flow chart illustrating an exemplary method for browser operation with sets of favorites according to embodiments of the present invention.

For further explanation, FIG. 2 sets forth a flow chart illustrating an exemplary method for browser operation with sets of favorites according to embodiments of the present invention. The method of FIG. 2 includes opening (202), by the browser (126), a first member of a set (102) of favorites in a new tab (104). Opening (202), by the browser (126), a first member of a set (102) of favorites in a new tab (104) may be carried out by accessing the resource identified by the URL associated with the favorite according to a data communications protocol specified by the URL. In the method of FIG. 2, opening (202), by the browser (126), a first member of a set (102) of favorites in a new tab (104) includes opening (204) the first member of the set of favorites responsive to a user-selection (218) of a drop-down menu option in the browser's Graphical User Interface ('GUI'). Opening (204) the first member of the set of favorites responsive to a user-selection (218) of a drop-down menu option in the browser's Graphical User Interface ('GUI') may be carried out by receiving one or more keyboard keystrokes, mouse actions, or other user interface device I/O, and opening the first member in a tab of the browser.

The method of FIG. 2 also includes loading (206), by the browser (126), a Uniform Resource Locator ('URL') (110) for each member of the set into navigation memory (108) for back (114) and forward (116) navigation functions for the new tab (104). Loading (206) a URL (110) for each member of the set into navigation memory (108) for back (114) and forward (116) navigation functions for the new tab (104) may be carried out by storing the URLs in a data structure, such as a table, list, file, or the like, where that data structure is associated with a new browser tab through a tab identifier ('tab ID'), or by storing each URL as an element of an array with a pointer that points to the currently opened URL of a browser tab, or by recording the URLs in an XML file, or in other ways as may occur to readers of skill in the art. Consider, for clarity of explanation, the following XML pseudo-code specifying navigation memory for several tabs of a browser:

```
<navigation_memory >
    < tab tabID="tab_1" >
        <URL, order="1"> http://www.patentlyo.com </URL>
        <URL; order="2"> http://www.uspto.gov </URL>
    </tab>
```

-continued

```
    < tab tabID="tab_2" >
        <URL, order="1"> http://www.bol.cnet.com </URL>
        <URL; order="2"> http://www.digg.com </URL>
        <URL; order="3"> http://www.ibm.com </URL>
    </tab>
</navigation_memory>
```

The example XML pseudo-code above specifies navigation memory for two tabs, one identified as tab_1 and another identified as tab_2. Tab_1 includes two URLs in its navigation memory, http://www.patnelyo.com and http://www.uspto.gov where each URL is assigned an order. The order of the tabs controls which URL the browser loads when the back function or forward function of the browser is invoked by a browsing user. When the current URL loaded in Tab_1 of the browser is http://www.uspto.gov and the back function is invoked, the browser loads the URL, http://www.patentlyo.com in accordance with the order specified for the URLs. When the current URL loaded in Tab_1 of the browser is http://www.patenlyo.com and the forward function of the browser is invoked, the browser loads the URL, http://www.uspto.gov in accordance with the order specified for the URLs. Tab_2 includes three URLs: http://www.bol.cnet.com, http://www.digg.com, and http://www.ibm.com. Readers of skill in the art will recognize that XML pseudo-code above is but one example implementation, described here for clarity of explanation, among many possible implementations of navigation memory for a tab of a browser configured for operation according to embodiments of the present invention.

In the method of FIG. 2, loading (206), by the browser (126), a URL (110) for each member of the set into navigation memory (108) for back (114) and forward (116) navigation functions for the new tab (104) includes loading (208) the URLs (110) in a user-arranged order. That is, a user may specify an order of the members of the set of favorites for purposes of browser navigation among the member of the set of favorites. A user may specify such an order by reorganizing the favorites in a order, through a graphical user interface, by dragging-and-dropping menu items representing the favorites, by assigned an order to each favorite in the set of favorites, and in other ways as will occur to readers of skill in the art. As mentioned above, the set of the favorites when opened and loaded into navigation memory may be referred to as a favorites playlist. Like a playlist for multimedia files, the favorites in the playlist may be organized in a particular order, referred to here as a browsing order, such that browsing among the favorites is carried out in accordance with the particular browsing order. Browsing amongst the is said to be carried out 'in accordance with' the particular browsing order, because browsing among the favorites according to embodiments of the present invention is typically not limited to only forward or only backward browsing. That is, browsing between favorites is bi-subsequent directional. The order of the URLs in navigation memory specifies a previous and subsequent URL for a currently loaded URL. The order is not limited to specifying only a subsequent URL. This bi-directional navigation among the favorites in a favorites playlist is analogous to the playback order of a multimedia files in a playlist, where playback of the multimedia files using next and previous functions of playback software is carried out bi-directionally according to the order of the multimedia files as specified in the multimedia playlist.

The method of FIG. 2 also includes loading (212), by the browser, one or more URLs (214) of a browser session history (216) into the navigation memory (108) for back and forward navigation functions. Loading (212), by the browser, one or more URLs (214) of a browser session history (216) into the navigation memory (108) for back and forward navigation functions may be carried out in many ways including, for example, by inserting the URLs of the browser session history into a data structure containing URLs of the set of favorites as part of a previously established favorites playlist. Loading (212) URLs (214) of a browser session history (216) into the navigation memory (108) may be carried out in response to user-selection or invocation of one or more actions through one or more GUI objects, such as a user-selection of a menu-option to add history items to a currently opened favorites playlist. Such URLs (214) may be effectively added to a previously established favorites playlist by adding the URLs (214) of browser history to the navigation memory of the previously opened new tab.

Figure 3:
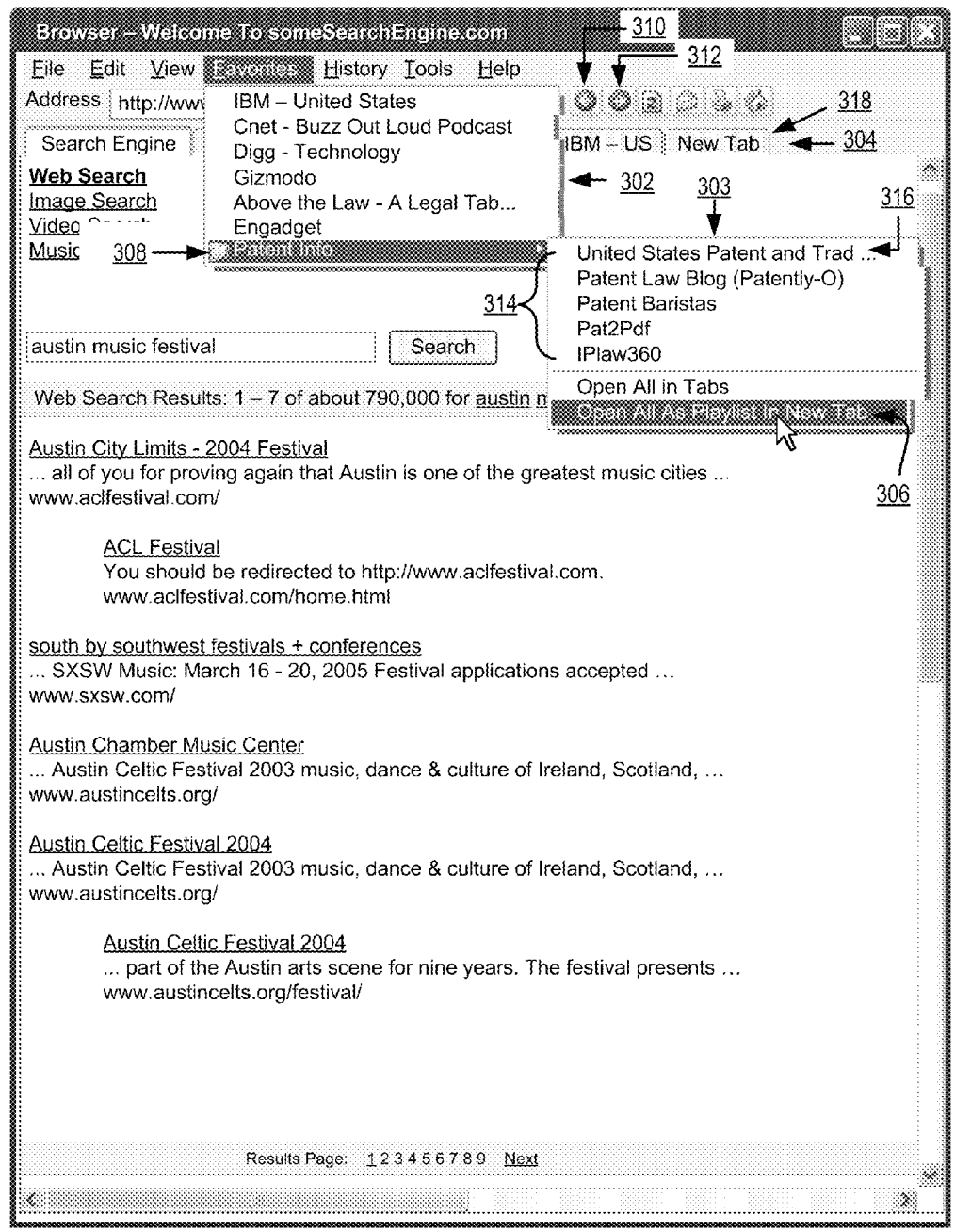
FIG. 3 sets forth a graphical user interface ('GUI') of an exemplary browser configured for operation according to embodiments of the present invention.

For further explanation, FIG. 3 sets forth a graphical user interface ('GUI') of an exemplary browser configured for operation according to embodiments of the present invention. The term 'browser' as used in this description of FIG. 3 may refer interchangeably to the GUI presented to a user for user interaction with the browser software module or the software module itself that operates according to embodiments of the present invention as described above with respect to FIG. 1 and FIG. 2.

The browser (301) of FIG. 3 includes a GUI toolbar with Back button (310), a Forward button (312), and buttons for refreshing the display, searching, and printing. The browser of FIG. 3 also includes a horizontal menu containing the menu items File, Edit, View, Favorites (called 'bookmarks' on some browsers), History, Tools, and Help. The example browser of FIG. 3 supports tabbed browsing. The example browser of FIG. 3 includes a row (304) of tabs, with the currently selected tab portraying a search engine web page and results of a search.

In the example of FIG. 3, a user has, through a mouse or keyboard, selected the Favorites drop-down menu (302), then selected the set (308) of favorites called "Patent Info" to generate another drop-down menu (303) for the set (308) of favorites. The drop-down menu (303) for the set (308) of favorites includes menu options for each of several members (314) of the set of favorites including, for example, the United States Patent and Trademark Office, the Patent Law Blog (Patently-O), Patent Baristas, Pat2Pdf, and IPlaw360. When a menu options for a member of the set of favorites is selected by a user, the browser (301) will load in a tab (304), the web page associated with menu option.

Also included in the drop-down menu (303) for the set (308) of favorites are two menu options for accessing multiple members of the set (308) including an option for opening all the members, each in separate tabs—"Open All in Tabs"—and an option (306) for opening all members (306) of the set (308) of favorites as a playlist in a new tab (318). The new tab (318) in the example of FIG. 3 is a tab having no URL presently loaded. When a user selects the "Open All as Playlist In New Tab" the browser (301) is configured to open the first member (316) of the set (102) of favorites, in this example the web page for the United States Patent and Trademark Office, in the new tab (318) and load a URL for each member (314) of the set into navigation memory for the Back (310) and Forward (312) buttons for the new tab (304). A user may also arrange the order of the members (314) of the set (308) of favorites by dragging-and-dropping the menu (303) options, or otherwise organizing the favorites, such that when the browser loads a URL for each member of the set into navigation memory for the Back (310) and Forward (312) buttons of the new tab (318), the browser loads the URLs in the user-arranged order.

Figure 4:
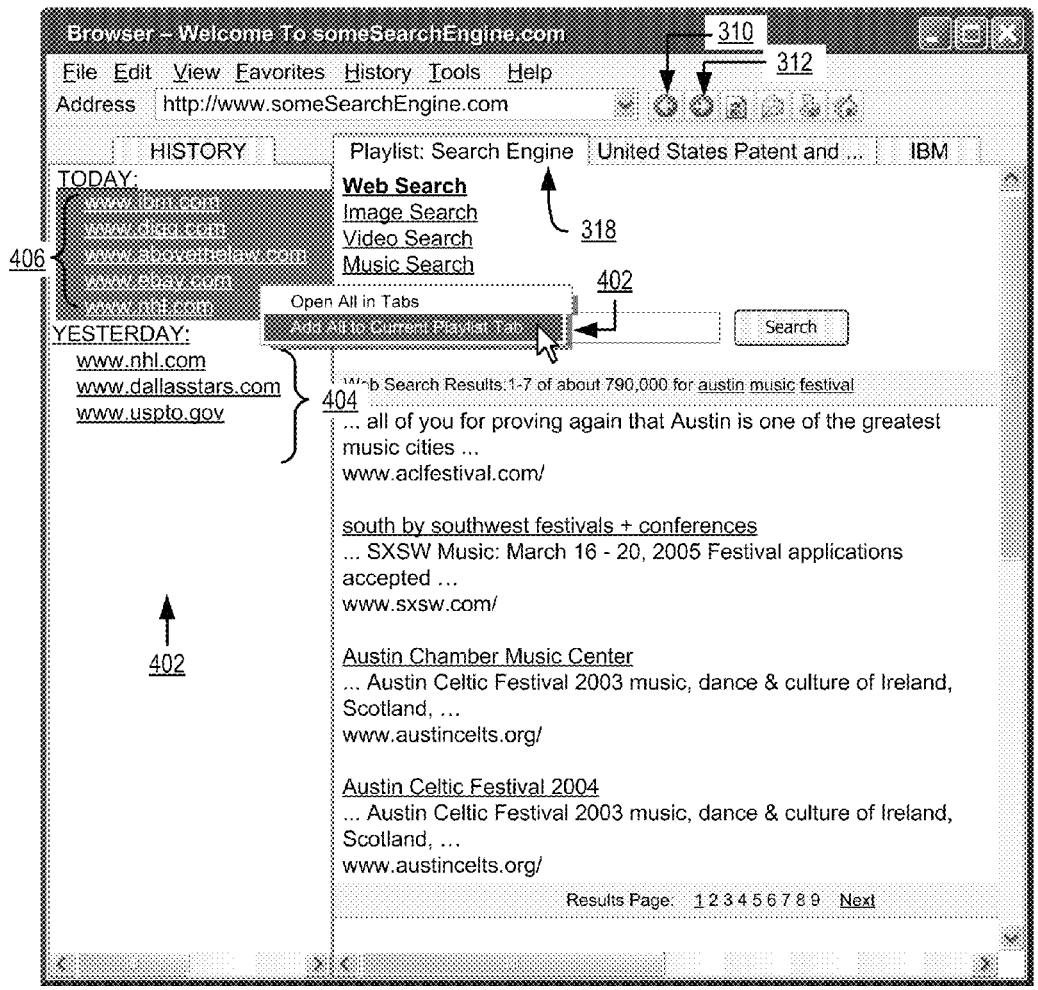
FIG. 4 sets forth a graphical user interface ('GUI') of an exemplary browser configured for operation according to embodiments of the present invention in which the browser loads URLs of a browser session history into the navigation memory for back and forward navigation functions of a new tab.

For further explanation, FIG. 4 sets forth a graphical user interface ('GUI') of an exemplary browser configured for operation according to embodiments of the present invention. The example of FIG. 4 is similar to the example of FIG. 3 in that the term 'browser' as used in this description of FIG. 4 may refer interchangeably to the GUI or the software module itself that operates according to embodiments of the present invention as described above with respect to FIG. 1 and FIG. 2. Also like the example of FIG. 3, the browser (301) example of FIG. 4 includes a GUI toolbar with Back button (310), a Forward button (312), and buttons for refreshing the display, searching, and printing. The browser of FIG. 4 also includes a horizontal menu containing the menu items File, Edit, View, Favorites (called 'bookmarks' on some browsers), History, Tools, and Help.

The example browser of FIG. 4 also supports tabbed browsing. The presently selected tab (318) in the example browser of FIG. 3 is a tab including a member of set of favorites. That is, the user in this example has selected, through keyboard keystrokes and mouse actions, a set of favorites to open as a playlist in a new tab, tab (318), as described above in FIG. 3. The presently selected tab (318) in this example includes a text description of the contents displayed within the tab, here a search engine located at the Uniform Resource Locator ('URL'), www.someSearchEngine.com. The text description in the tab also identifies the contents of the tab as a member of a playlist, a set of favorites opened in the tab.

The example browser of FIG. 4 also includes an GUI side-bar (401) that displays the user's browsing History. Browser history is a record of one or more URLs previously loaded into a tab, that is URLs previously browsed by a user. Session history is a record of URLs previously browsed during some predefined period of time, such as all URLs browsed yesterday, all URLs browser between the time the started and stopped the browser software, and other predefined periods of time as will occur to readers of skill in the art. The user's browsing history in the example of FIG. 4 includes two session histories, one session history identifying URLs browsed today (406) by the user, and one session history identifying URLs browsed yesterday (404). Such historical records of browsing may also be accessed through the History drop-down menu in the GUI tool bar of the browser.

In the example of FIG. 4, the user has selected all URLs in the browser session history for today (406), and caused the browser to present a drop-down menu with two menu options: one for opening each of the selected URLs in a separate tab, "Open All in Tabs," and another menu option (402) for adding the URLs to previously established single playlist tab. That is, when the user selects the "Add All to Current Playlist Tab" menu option the browser loads the URLs of the browser session history for today (406) into the navigation memory for the Back (310) and Forward (312) buttons for the previously established playlist tab (318). The user may then browse in the same tab (318), the URLs of today's session history (406) along with, that is, in addition to, the set of favorites previously loaded into navigation memory for that tab (318).

Exemplary embodiments of the present invention are described largely in the context of a fully functional computer system for browser operation with sets of favorites. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of browser operation with at least one set of favorites, the method comprising:
    opening, by a web browser, a first webpage member of a set of webpage favorites in a new tab of the web browser, the web browser supporting tabbed browsing;
    changing a functionality of each of a back and a forward navigation functions for the new tab by loading, by the web browser, a Uniform Resource Locator ('URL') for each webpage member of the set into navigation memory of the new tab, the navigation memory for the back and forward navigation functions for the new tab, defining a browsing order of the set of webpage favorites, such that the functionality of the back and forward navigation functions for the new tab are different from a standard functionality of the back and forward navigation functions of other tabs of the web browser in that, as changed, the back and forward navigation functions load a URL of a previous and a subsequent webpage favorite from the navigation memory respectively; and
    opening, by the web browser, second webpage member of the set in the new tab in response to a user-selection of a navigation function comprising one of the back and forward navigation functions for the new tab, wherein the second webpage comprises a webpage member ordered in navigation memory prior to the first webpage member in response to the user-selection comprising the back navigation function and wherein the second webpage comprises a webpage member ordered in navigation memory subsequent to the first webpage member in response to the user-selection comprising the forward navigation function; and
    opening, by the web browser, an original tab in the web browser, wherein opening the first webpage member of a set of webpage favorites in the new tab occurs after opening the original tab;
    maintaining the standard functionality of back and forward navigation functions for the original tab as the functionality is changed for the back and forward navigation functions for the new tab.

2. The method of claim 1 further comprising:
    loading, by the web browser, one or more URLs of a browser session history into the navigation memory for back and forward navigation functions.

3. The method of claim 1 wherein opening, by the web browser, a first webpage member of a set of webpage favorites in a new tab further comprises opening the first webpage member of the set of favorites responsive to a user-selection of a drop-down menu option in the browser's Graphical User Interface ('GUI').

4. The method of claim 1 wherein the set of webpage favorites further comprises URLs organized as a set of favorites in a markup document.

5. The method of claim 1 wherein the set of webpage favorites is specified in one or more records of a database, each record including a URL for a specific webpage member and an identification of the set for the specific webpage member.

6. An apparatus for browser operation with at least one set of favorites, the apparatus comprising a computer processor, a computer memory operatively coupled to the computer processor, the computer memory having disposed within it computer program instructions capable of:
    opening, by a web browser, a first webpage member of a set of webpage favorites in a new tab of the web browser, the web browser supporting tabbed browsing;
    changing a functionality of each of a back and a forward navigation functions for the new tab by loading, by the web browser, a Uniform Resource Locator ('URL') for each webpage member of the set into navigation memory of the new tab, the navigation memory for the back and forward navigation functions for the new tab, defining a browsing order of the set of webpage favorites, such that the functionality of the back and forward navigation functions for the new tab are different from a standard functionality of the back and forward navigation functions of other tabs of the web browser in that, as changed, the back and forward navigation functions load a URL of a previous and a subsequent webpage favorite from the navigation memory respectively; and
    opening, by the web browser, second webpage member of the set in the new tab in response to a user-selection of a navigation function comprising one of the back and forward navigation functions for the new tab, wherein the second webpage comprises a webpage member ordered in navigation memory prior to the first webpage member in response to the user-selection comprising the back navigation function and wherein the second webpage comprises a webpage member ordered in navigation memory subsequent to the first webpage member in response to the user-selection comprising the forward navigation function; and
    opening, by the web browser, an original tab in the web browser, wherein opening the first webpage member of a set of webpage favorites in the new tab occurs after opening the original tab;
    maintaining the standard functionality of back and forward navigation functions for the original tab as the functionality is changed for the back and forward navigation functions for the new tab.

7. The apparatus of claim 6 further comprising computer program instructions capable of:

loading, by the web browser, one or more URLs of a browser session history into the navigation memory for back and forward navigation functions.

8. The apparatus of claim 6 wherein loading a URL for each webpage member of the set into navigation memory for back and forward navigation functions for the new tab further comprises loading the URLs in a user-arranged order.

9. The apparatus of claim 6 wherein opening, by the web browser, a first webpage member of a set of webpage favorites in a new tab further comprises opening the first webpage member of the set of webpage favorites responsive to a user-selection of a drop-down menu option in the browser's Graphical User Interface ('GUI').

10. The apparatus of claim 6 wherein the set of webpage favorites further comprises URLs organized as a set of favorites in a markup document.

11. The apparatus of claim 6 wherein the set of webpage favorites is specified in one or more records of a database, each record including a URL for a specific webpage member and an identification of the set for the specific webpage member.

12. A computer program product for browser operation with at least one set of favorites, the computer program product disposed in a recordable, non-transitory computer readable storage medium containing computer program instructions capable of:
opening, by a web browser, a first webpage member of a set of webpage favorites in a new tab of the web browser, the web browser supporting tabbed browsing;
changing a functionality of each of a back and a forward navigation functions for the new tab by loading, by the web browser, a Uniform Resource Locator ('URL') for each webpage member of the set into navigation memory of the new tab, the navigation memory for the back and forward navigation functions for the new tab, defining a browsing order of the set of webpage favorites, such that the functionality of the back and forward navigation functions for the new tab are different from a standard functionality of the back and forward navigation functions of other tabs of the web browser in that, as changed, the back and forward navigation functions load a URL of a previous and a subsequent webpage favorite from the navigation memory respectively; and
opening, by the web browser, second webpage member of the set in the new tab in response to a user-selection of a navigation function comprising one of the back and forward navigation functions for the new tab, wherein the second webpage comprises a webpage member ordered in navigation memory prior to the first webpage member in response to the user-selection comprising the back navigation function and wherein the second webpage comprises a webpage member ordered in navigation memory subsequent to the first webpage member in response to the user-selection comprising the forward navigation function; and
opening, by the web browser, an original tab in the web browser, wherein opening the first webpage member of a set of webpage favorites in the new tab occurs after opening the original tab;
maintaining the standard functionality of back and forward navigation functions for the original tab as the functionality is changed for the back and forward navigation functions for the new tab.

13. The computer program product of claim 12 further comprising computer program instructions capable of:
loading, by the web browser, one or more URLs of a browser session history into the navigation memory for back and forward navigation functions.

14. The computer program product of claim 12 wherein loading a URL for each webpage member of the set into navigation memory for back and forward navigation functions for the new tab further comprises loading the URLs in a user-arranged order.

15. The computer program product of claim 12 wherein opening, by the web browser, a first member of a set of favorites in a new tab further comprises opening the first member of the set of webpage favorites responsive to a user-selection of a drop-down menu option in the browser's Graphical User Interface ('GUI').

16. The computer program product of claim 12 wherein the set of webpage favorites further comprises URLs organized as a set of favorites in a markup document.

17. The computer program product of claim 12 wherein the set of webpage favorites is specified in one or more records of a database, each record including a URL for a specific webpage member and an identification of the set for the specific webpage member.

18. The method of claim 1, wherein opening the first webpage member in the new tab and loading the URL for each webpage member of the set into navigation memory occur in response to a user-selection through a graphical user interface ('GUI') of the browser.

19. The apparatus of claim 6, wherein opening the first webpage member in the new tab and loading the URL for each webpage member of the set into navigation memory occur in response to a user-selection through a graphical user interface ('GUI') of the browser.

* * * * *